US007880799B2

(12) United States Patent
Yamasaki

(10) Patent No.: US 7,880,799 B2
(45) Date of Patent: Feb. 1, 2011

(54) FOCUS DETECTING APPARATUS AND IMAGE PICKUP APPARATUS

(75) Inventor: Ryo Yamasaki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/478,243

(22) Filed: Jun. 28, 2006

(65) Prior Publication Data
US 2007/0002161 A1 Jan. 4, 2007

(30) Foreign Application Priority Data
Jun. 30, 2005 (JP) ............................... 2005-191187

(51) Int. Cl.
*H04N 5/232* (2006.01)
(52) U.S. Cl. .................. 348/345; 396/104; 348/208.12
(58) Field of Classification Search ................. 348/272; 396/104
See application file for complete search history.

(56) References Cited

U.S. PATENT DOCUMENTS

| | | | | |
|---|---|---|---|---|
| 4,843,415 A | * | 6/1989 | Matsui et al. ................. 396/80 |
| 5,243,375 A | * | 9/1993 | Ishida et al. ................. 396/123 |
| 5,430,287 A | * | 7/1995 | Kusaka .................... 250/201.5 |
| 5,636,029 A | * | 6/1997 | Zimmerman et al. ........ 356/626 |
| 5,693,439 A | * | 12/1997 | Tanaka et al. .................. 430/30 |
| 5,839,001 A | * | 11/1998 | Ohtaka et al. ................ 396/114 |
| 5,841,139 A | * | 11/1998 | Sostek et al. ........... 250/339.12 |
| 5,864,721 A | * | 1/1999 | Suda et al. .................... 396/114 |
| 5,892,578 A | | 4/1999 | Suda |
| 6,643,460 B2 | * | 11/2003 | Uchiyama et al. ........... 396/114 |
| 7,108,945 B2 | * | 9/2006 | Sutani et al. .................... 430/5 |
| 2002/0197542 A1 | * | 12/2002 | Lai et al. ........................ 430/5 |

FOREIGN PATENT DOCUMENTS

| | | |
|---|---|---|
| JP | 61-15112 | 1/1986 |
| JP | 9-184965 | 7/1997 |
| JP | 10-311945 | 11/1998 |

* cited by examiner

*Primary Examiner*—Jason Chan
*Assistant Examiner*—Cynthia Calderon
(74) *Attorney, Agent, or Firm*—Canon U.S.A., Inc. I.P. Division

(57) ABSTRACT

A focus detecting apparatus includes a splitter for splitting a light from an image pickup lens to form at least a pair of images, a photoelectric conversion element for photoelectrically converting at least the pair of images, the focus detecting apparatus detecting a focusing status of the image pickup lens based on a signal from the photoelectric conversion element, and a light blocking mask for blocking the light from entering the photoelectric conversion element, the light blocking mask having a curve shape in a moving direction of the image that varies according to an image height.

9 Claims, 9 Drawing Sheets

PRIOR ART

FOCUS DETECTING APPARATUS AND IMAGE PICKUP APPARATUS

BACKGROUND OF THE INVENTION

The present invention relates to an image pickup apparatus, and more particularly to an image pickup apparatus that includes a focus detecting apparatus that detects a focusing status of an image pickup lens. The present invention is suitable, for example, for a digital still camera.

Along with widespread digital and video cameras, etc., the image pickup apparatuses have been increasingly required for the high quality and improved operability. In particular, a focus detecting apparatus or optical system (while these terms are interchangeable in this application) which detects a focusing status of an image pickup lens is required for the improved precision and speed. For instance, the recent mainstream is a focus detecting apparatus of a phase difference detection ("PDD") system that needs a much shorter focusing time period than the contrast detection system.

Referring to FIG. 19, a description will be given of the PDD focus detection principle. FIG. 19 is a schematic sectional view of a PDD focus detecting optical system 1000. A field lens 1010 images an exit pupil of an image pickup lens IL on pupil planes of at least a pair of secondary imaging lenses 1020. Thereby, the light incident upon the secondary imaging lenses 1020 are emitted from regions that have the same areas and are located at different positions, on the exit pupil of the image pickup lens IL. A stop 1030 having openings corresponding to the secondary imaging lenses 1020 is located in front of the secondary imaging lenses 1020. The secondary imaging lenses 1020 re-image an aerial image which the image pickup lens IL has imaged near the field lens 1010, onto at least a pair of sensors (photoelectric conversion elements) 1040. Since re-imaged positions relatively vary based on an imaging position of the photographing optical axis of the aerial image, this configuration can detect a focusing status of the image pickup lens IL (i.e., a defocus amount and a defocus direction) by detecting a variation amount of the relative position and moving direction.

There are proposed a multipoint focus detection that provides multiple focus detecting regions used to detect longitudinal and lateral lines in the photographing screen, an area type focus detection that detects focus in a continuous area in a wide range, etc. See Japanese Patent Application, Publication No. 9-184965. An image pickup apparatus disclosed in this reference basically detects a focusing status of the image pickup lens by utilizing the PDD system. In this reference, a subsidiary mirror that introduces the light that has passed the image pickup lens to a focus detecting optical system maintains an imaging relationship between an exit pupil of the image pickup lens and a stop of the focus detecting optical system, and serves as a field lens. In other words, the subsidiary mirror and the stop serve as pupil splitting means, and can introduce plural lights that have passed the exit pupil of the image pickup lens to the focus detecting optical system.

FIG. 20 is a schematic plane view showing a stop 1100 and a secondary imaging lens 1200 in the focus detecting optical system in the above reference. The stop 1100 has a pair of openings 1110 and 1120 and a pair of openings 1130 and 1140. The secondary imaging lens 1200 includes a pair of lens elements 1210 and 1220 and a pair of lens elements 1230 and 1240, corresponding to two pairs of openings. The secondary imaging lens 1200 having four lens elements images the lights perpendicularly split by the openings 1110 and 1120 and the lights horizontally split by the opening 1130 and 1140 among the lights that have passed the exit pupil of the image pickup lens, thereby forming four optical images on a sensor or secondary imaging plane. The focusing status is recognized by detecting phase shifts of the four optical images caused by the defocus of the image pickup lens.

FIG. 21 is a schematic plane view showing a sensor 1300 in the focus detecting optical system in the above reference. The sensor 1300 has four photoelectric conversion areas for the secondary imaging lens 1200. The lens elements 1210 and 1220 correspond to the photoelectric conversion areas 1310 and 1320, respectively. The lens elements 1230 and 1240 correspond to the photoelectric conversion areas 1330 and 1340, respectively. Optical images projected onto the photoelectric conversion areas 1310 and 1320 result from the lights that have passed the openings 1110 and 1120 or the perpendicularly split light of the exit pupil of the image pickup lens. As the image pickup lens defocuses, these optical images move in an approximately perpendicular direction. Therefore, the photoelectric conversion areas 1310 and 1320 each have plural closely arranged, perpendicularly extending line sensors. Similarly, the photoelectric conversion areas 1330 and 1340 each have plural closely arranged, horizontally extending line sensors.

FIG. 22 is a schematic plane view of an optical image OI in each photoelectric conversion area of the sensor 1300. Optical images OI1 and OI2 correspond to the photoelectric conversion areas 1310 and 1320, and optical images OI3 and OI4 correspond to the photoelectric conversion areas 1330 and 1340. Each optical image on a prospective imaging plane or an image sensor plane in the image pickup apparatus has a rectangular lattice shape projected on the sensor 1300, but its shape is distorted with respect to a centerline C as a symmetrical axis due to a distortion of the subsidiary mirror etc. In other words, the optical image is distorted into a sectorial shape.

FIG. 23 is a schematic plane view of a prospective imaging plane PIS of the image pickup apparatus, showing a back-projected state of the photoelectric conversion area 1300 shown in FIG. 21. As discussed above, since the rectangular lattice shape on the prospective imaging plane PIS has a sectorial shape on the sensor 1300, the photoelectric conversion area that would be otherwise rectangular on the secondary imaging plane has a sectorial distortion on the prospective imaging plane PIS. Hence, a back-projected image RP1 of the photoelectric conversion areas OI1 and OI2 has a sectorial shape. Since the photoelectric conversion areas OI1 and OI2 have approximately the same shape on the prospective imaging plane PIS, FIG. 23 shows only one back-projected image RP1. Similarly, a back-projected image RP2 of the photoelectric conversion area OI3 and OI4 has a sectorial shape.

The above reference arranges approximately perpendicular line sensors shown by the back-projected image RP1 in a wide range, and approximately horizontal line sensors shown by the back-projected image RP2 at the center. The perpendicular line sensors detect the focusing status of the subject image having a contrast component in the approximately perpendicular direction, and the horizontal line sensors detect the focusing status of the subject image having a contrast component in the approximately horizontal direction: The back-projected image RP1 provides lateral line focus detection, the back-projected image RP2 provides vertical line focus detection, and a so-called cross type focus detection is provided in the common area.

The focusing status is detected, for example, by using the optical images OI1 and OI2 to detect defocus caused perpendicular movements. However, strictly speaking, these optical images have no similarity since the symmetrical axis of the optical image is the centerline C. The similarity especially lowers as a distance from the center of each optical image increases. Thus, the rectangular photoelectric conversion area including a one-dimensionally arranged line sensors has an error in the focus detection result. This is true of the optical images OI3 and OI4.

One proposed solution is a focus detecting apparatus that includes a light blocking mask having an opening shape corresponding to an optical image's distortion in the photoelectric conversion area, and eliminates an error in the focus detection. See, for example, Japanese Patent Application, Publication No. 61-15112. Referring now to FIG. 24, an illustrative description will be given of most distant line sensors 1312 and 1322 from the center of the respective optical images in a pair of photoelectric conversion areas 1310 and 1320.

FIG. 25 is a schematic plane view of the prospective imaging plane PIS of the image pickup apparatus, showing a back-projected image RP1' of the line sensor 1312 and a back-projected image RP2' of the line sensor 1322. Strictly speaking, as described above, the back-projected images RP1' and RP2' correspond to each other due to the optical images' distortions, although FIG. 25 exaggerates the shift. When the pair of line sensors do not correspond to each other, the defocus occurs for the subject. Thus, the light blocking mask is provided which provides a light receiving area or photoelectric conversion area only at the common area of the pair of line sensors.

FIG. 26 is an enlarged view of the back-projected images RP1' and RP2' shown in FIG. 25, and shows a light blocking mask SM that blocks the light other than the common area between the line sensors 1312 and 1322. Therefore, the pair of line sensors receive the light of the common part of the subject, and can eliminate an error in the focus detection for the subject. Although the two line sensors do not correspond to each other in the approximately longitudinal direction, the error can be eliminated, for example, by a signal processing correction disclosed in Japanese Patent Application, Publication No. 10-311945.

As the image pickup lens defocuses, the back-projected images RP1' and RP2' (line sensors 1312 and 1322 move in the approximately longitudinal direction. Nevertheless, strictly speaking, the distortion of the focus detecting optical system varies the moving directions according to an image height, and deforms the back-projected images RP1' and RP2' of the line sensors 1312 and 1322. When the light blocking mask provides is a common light receiving area between the line sensors 1312 and 1322 during an in-focus time period, an offset occurs between these two line sensors' light receiving areas during a defocus or out-of-focus time period and this offset increases as the defocus amount becomes large.

It is important for the PDD system to receive the light at the common area of the pair of line sensors on the prospective imaging plane during an in-focus time period, and to receive the light at a position that shifts only in a one-dimensional direction as a pupil splitting direction during a defocus time period. In other words, it is important that no parallaxes occur in a direction other than in the one-dimension direction.

Nevertheless, the above prior art cause a parallax in a direction other than the one-dimensional direction, and thus an error in focus detection for the subject during a defocus time period. Thereby, the image pickup lens cannot be in focus in one focus detection action, and needs plural focus detection actions, deteriorating quick in-focus of the image pickup lens or shortened detection time period, which is the most favorable advantage of the PDD system.

The above error occurs among all the line sensors in the sensor in the focus detecting optical system, and is particularly conspicuous in a distant line sensor from the center of the optical image or in an attempt to expand the focus detection range from the conventional range.

BRIEF SUMMARY OF THE INVENTION

It is an illustrative object of the present invention to provide a focus detecting apparatus that precisely and quickly detects a focusing status in a wide range in the image taking range, and an image pickup apparatus having the same.

A focus detecting apparatus according to one aspect of the present invention includes a splitter for splitting a light from an image pickup lens to form at least a pair of images, a photoelectric conversion element for photoelectrically converting at least the pair of images, the focus detecting apparatus detecting a focusing status of the image pickup lens based on a signal from the photoelectric conversion element, and a light blocking mask for blocking the light from entering the photoelectric conversion element. In one embodiment, the light blocking mask has a curve shape in a moving direction of the image that varies according to an image height. In another embodiment, the light blocking mask has a curve shape with a curvature that increases from a center to an outside of the photoelectric conversion element. In still another embodiment, the light blocking mask has a uniform opening on an imaging plane of the image pickup lens. In yet another embodiment, the light blocking mask has a shape that generates no parallax in a defocus state of the image pickup lens in a direction orthogonal to a moving direction of the image that varies according to an image height.

An image pickup apparatus according to another aspect of the present invention for taking a subject image via an image pickup lens includes the above focus detecting apparatus, and a controller for providing focus control of the image taking lens based on a detection result of the focus detecting apparatus.

An method according to another aspect of the present invention for forming a light blocking mask of the focus detecting apparatus that splits a light from an image pickup lens, forms at least a pair of images, and detects a focusing status of an image pickup lens based on a signal from a photoelectric conversion element for photoelectrically converting at least the pair of images includes the steps of calculating a curve along a moving direction of the image that varies according to an image height on an imaging plane of the image pickup lens, determining a shape of the light blocking mask on the imaging plane based on the curve shape calculated by the calculating step, and projecting the shape of the light blocking mask onto the photoelectric conversion element, determined by the determining step.

Other objects and further features of the present invention will become readily apparent from the following description of the preferred embodiments with reference to the accompanying drawings.

DETAILED DESCRIPTION OF THE PREFERRED EMBODIMENTS

Referring now to the accompanying drawings, a description will be given of a preferred embodiment of the present invention.

Figure 1:
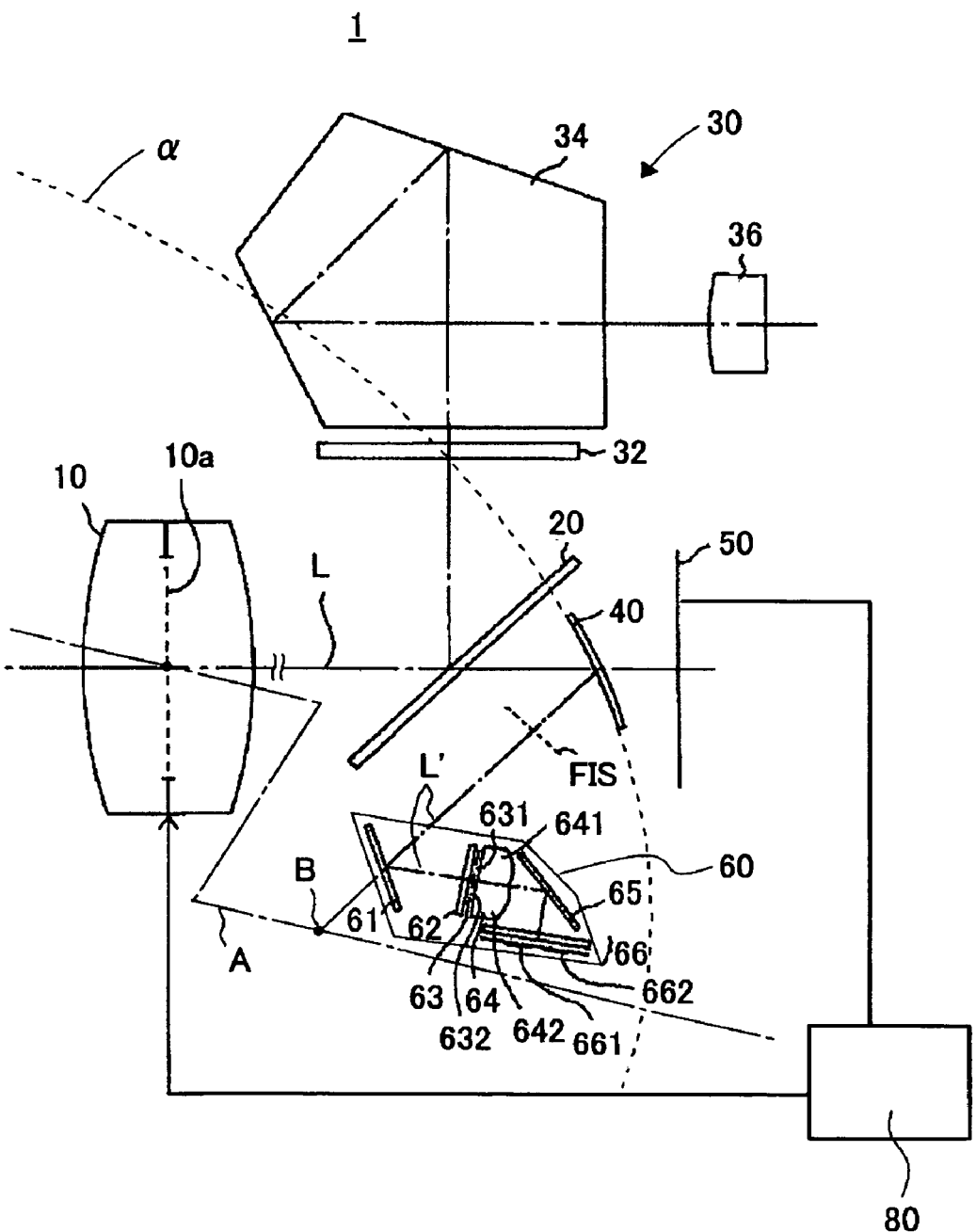
FIG. 1 is a schematic sectional view showing a structure of an image pickup apparatus according to one embodiment of the present invention.

FIG. 1 is a schematic sectional view showing a structure of the image pickup apparatus 1 according to one embodiment of the present invention.

The image pickup apparatus 1 images a light from a subject onto an image sensor via an image pickup lens, and photographs the subject. The image sensor is implemented as a digital single-lens reflex ("DSLR") camera.

The image pickup apparatus 1 includes, as shown in FIG. 1, an image pickup lens 10, a main mirror 20, a finder optical system 30, and a subsidiary mirror 40, an image sensor or image pickup device 50, a focus detecting optical system 60, and a controller 80. The main mirror 20, the finder optical system 30, the subsidiary mirror 40, the image sensor 50, the focus detecting optical system 60, and the controller 80 constitute a camera body, which is detachable from the image pickup lens 10 via a mount part (not shown). Therefore, the image pickup lens 10 is not necessarily an element of the image pickup apparatus 1.

The image pickup lens 10 is an exchangeable image taking lens that shots the subject, and includes an image pickup optical system that includes a focusing lens. The controller 80, which will be described later, controls focusing of the image pickup lens 10 via the focusing lens. In FIG. 1, L denotes an optical axis of the image pickup lens 10.

The main mirror 20 is made of a semi-transmitting mirror, and reflects and introduces to a focusing glass 32, which will be described later, part of the light that has passed the image pickup lens 10, and transmits the remaining light that has passed the image pickup lens 10.

The finder optical system 30 is an optical system for viewing the subject to be captured, and includes a focusing glass 32, a pentaprism or pentagonal prism 34, and an eyepiece 36. In other words, the finder optical system 30 provisionally provides a user with a subject image to be taken.

The focusing glass 32 spreads the light or subject image from the image pickup lens 10 reflected on the main mirror 20, and emits the light to the pentaprism 34. The pentaprism 34 includes two reflecting surfaces that form an angle of 45°, and two refracting surfaces that form a right angle to the incident light and the exit light. The pentaprism 34 reflects the light spread by the focus plate 32, and introduces the light to the eyepiece 36. The eyepiece 36 serves to finally form an image in the finder optical system 30. The eyepiece 36, for example, enlarges an optical image.

The subsidiary mirror 40 reflects the light that transmits the main mirror 20, and introduces the light to the focus detecting optical system 60, which will be described later. The subsidiary mirror 40 will be described in detail with the focus detecting optical system 60. A quick return mechanism (not shown) move the main mirror 20 and the subsidiary mirror 40 in place on the photographing optical path during focus detections or during finder viewing (see FIG. 1), and retreat them from the photographing optical path during photography. FIS denotes a primary imaging plane optically equivalent with the image sensor (prospective imaging plane) 50, and is formed by the subsidiary mirror 40.

The image sensor 50 is arranged on the prospective imaging plane of the image pickup lens 10. The image sensor 50 has regularly arranged pixels, receives the light from the subject imaged by the image pickup lens 10, and has a photoelectric conversion function that converts the light into an image signal. The image sensor 50 is implemented, for example, as a line (or one-dimensional) sensor or an area (or two-dimensional) sensor that converts the received light into an image signal for each pixel, stores the charges indicative of the received light intensity, and reads the charges. The image sensor 50 may be a CMOS sensor. An image processor (not shown) processes an output signal from the image sensor 50 into image data, and the image data is recorded in a recording medium (not shown), such as a semiconductor memory, an optical disc, and a magnetic tape.

The focus detecting optical system 60 utilizes a PDD system to detect the focusing status of the image pickup lens 10. More specifically, the focus detecting optical system 60 splits the light from the image pickup lens 10, forms at least a pair of optical images, and detects the focusing status of the image pickup lens 10 based on the signal obtained from the photoelectric conversion of the pair of optical images. The focus detecting optical system 60 includes a first plane mirror 61, an infrared blocking glass 62, a stop 63, a secondary imaging lens 64, a second plane mirror 65, and a focus detecting sensor 66 in this embodiment.

The light introduced by the subsidiary mirror 40 is reflected on the first plane mirror 61, and passes the infrared blocking glass 62, the stop 63, and the secondary imaging lens 64 in this order in the focus detecting optical system 60. After passing the secondary imaging lens 64, the light is finally introduced to the focus detecting sensor 66, which includes, for example, a cover glass, and a sensor chip having a photoelectric conversion element arranged near a secondary imaging plane. L' denotes an optical axis after the optical axis L passes the main mirror 20, a subsidiary mirror 40, and the first plane mirror 61.

The subsidiary mirror 40 is formed as part of a spheroid in this embodiment, and the spheroid is formed by rotating an ellipse α shown by a dotted line in FIG. 1 around a center axis A. One of two focal points of the ellipse α is set at an exit pupil 10a of the image pickup lens 10, and the other focal point is set to a point B as a nodal between the center axis A and the optical axis L' deflected by the subsidiary mirror 40. In other words, the point B is a center point of the aerially converted stop 63 inverted by the first plane mirror 61. Due to the ellipse's fundamental characteristics, the light emitted from one focal point passes the other focal point irrespective of a reflection on any point of the spheroid. Thus, the subsidiary mirror 40 maintains an imaging relationship between the stop 63 in the focus detecting optical system 60 and the exit pupil 10a of the image pickup lens 10. In other words, the subsidiary mirror 40 serves as both a field lens and a pupil splitting means in cooperation with the stop 63 in this embodiment. An opening properly formed in the stop 63 would enable plural lights that split the exit pupil 10a of the image pickup lens 10 to be introduced to the focus detecting sensor 66 in the focus detecting optical system 60.

In general, for a wider focus detecting range in a shooting range, a light in a wider range should be introduced to the focus detecting optical system 60. Thus, the subsidiary mirror 40 should be moved as close as possible to the image sensor or prospective imaging plane 50, and the reflecting area of the subsidiary mirror 40 is made as large as possible. Thereby, as shown in FIG. 1, the primary imaging plane FIS moves to the subsidiary mirror 40.

The focus detecting optical system using the field lens needs to arrange the field lens and field mask near the primary imaging plane FIS. These members project into the photographing optical axis and needs a retreating mechanism. On the other hand, since the subsidiary mirror 40 in this embodiment forms the part of the spheroid and serves as the pupil splitting means, this embodiment does not require the field lens. In addition, the subsidiary mirror 40 serves as a field mask when it is configured not to reflect the light other than a necessary area for the focus detection. Thereby, the subsidiary mirror 40 can easily be made larger, and consequently the focus detecting optical system 60 realizes a PDD focus detection in a wide range.

Figures 2, 3:
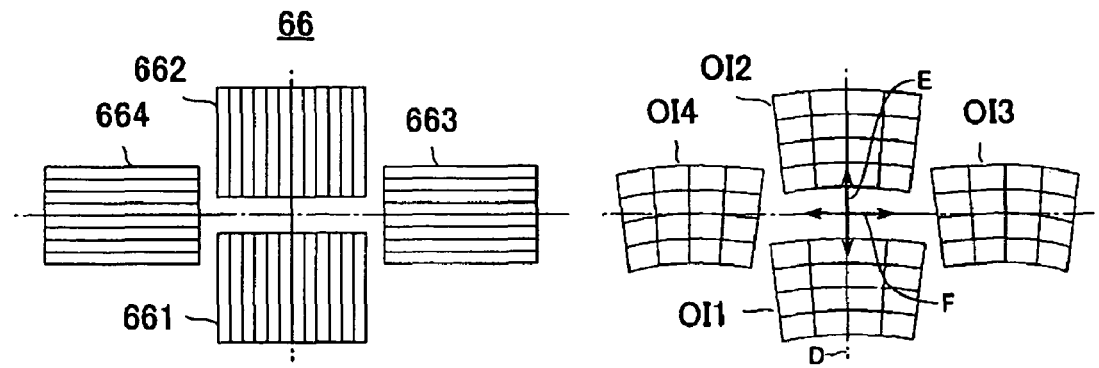
FIG. 2 is a schematic plane view showing a focus detecting sensor in a focus detecting optical system shown in FIG. 1.
FIG. 3 is a schematic plane view showing optical images formed in photoelectric conversion areas of the focus detecting sensor on FIG. 2.

FIG. 2 is a schematic plane view of the focus detecting sensor 66 in the focus detecting optical system 60, showing a sensor chip having photoelectric conversion elements viewed from a cover glass. The focus detecting sensor 66 has plural closely arranged line sensors that have plural photoelectric conversion elements arranged in the one-dimensional directions. The focus detecting sensor 66 has a pair of photoelectric conversion areas 661 and 662 and a pair of photoelectric conversion areas 663 and 664.

The photoelectric conversion areas 661 and 662 have perpendicularly arranged line sensors. The photoelectric conversion areas 663 and 664 have horizontally arranged line sensors. Each of the photoelectric conversion areas 661 to 664 corresponds to four lens elements in the secondary imaging lens 64, although FIG. 1 shows only two lens elements 641 and 642. The stop 63 has four openings corresponding to four lens elements of the secondary imaging lens 64, although FIG. 1 shows only two openings 631 and 632. The light that has passed the opening 631 forms one optical image via the lens element 641 in the secondary imaging lens 64, and the photoelectric conversion area 661 of the focus detecting sensor 66 detects the optical image. This is similar to the other photoelectric conversion areas 662 to 664.

In this embodiment, the pair of photoelectric conversion areas 663 and 664 having horizontally arranged line sensors have the same area as the pair of photoelectric conversion areas 661 and 662, enabling the focus detection in a wider range in the image sensor or prospective imaging plane 50, as described later.

FIG. 3 is a schematic plane view of optical images OI1 to OI4 formed by the photoelectric conversion areas 661 to 664 in the focus detecting sensor 66. The optical image OI1 corresponds to the photoelectric conversion area 661. The optical image OI2 corresponds to the photoelectric conversion area 662. The optical image OI3 corresponds to the photoelectric conversion area 663. The optical image OI4 corresponds to the photoelectric conversion area 664.

As shown in FIG. 3, the four optical images OI1 to OI4 generate a sectorial distortion since the subsidiary mirror 40 as the part of the spheroid is inclined to the optical path of the focus detecting optical system 60. In other words, the four optical images OI1 to OI4 have a distortion with respect to a centerline D as a symmetrical axis. Among the four optical images OI1 to OI4, with defocus of the image pickup lens 10, the optical images OI1 and OI2 move in an arrow E (or perpendicular) direction, and the optical images OI3 and OI4 move in an arrow D (or horizontal) direction. As a consequence, a change of an interval between the optical images OI1 and OI2 and a change of an interval between the optical images OI3 and OI4 are detected as a phase difference. For example, one-dimensional image signals corresponding to the optical images OI1 to OI4 are formed from output signals of line sensors of the photoelectric conversion areas 661 to 664, and a phase difference is detected using a correlation operation. A relationship between the phase difference and the defocus of the image pickup lens 10 can be approximated by a predetermined function, and the image pickup lens 10 can be focused by detecting the phase difference.

On the other hand, in the secondary imaging lens 64, a lens element (not shown) at the incident side has only one concave spherical surface. In case of a straight optical system that arranges no first plane mirror 61, the center of the spherical surface is located near the primary imaging surface FIS. The lens elements 641 and 642 at the exit side have a convex spherical surface, and the center of the spherical surface is located near the center of the opening of the corresponding stop 63. Therefore, the light that emits from the center of the primary imaging plane FIS and passes the center of the opening of the stop 63 is seldom refracted in the secondary imaging lens 64. This configuration makes an imaging position constant irrespective of the wavelength, and provides precise focus detection without relying upon a wavelength component of the subject.

Figure 4:
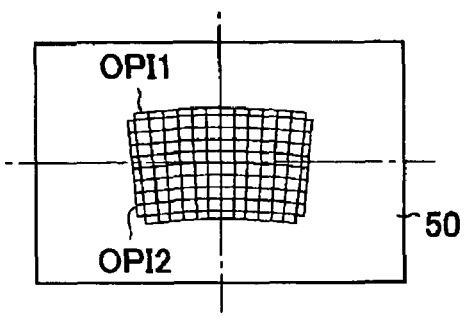
FIG. 4 is a schematic plane view showing an image sensor or prospective imaging plane, on which photoelectric conversion areas shown in FIG. 3 are back-projected.

FIG. 4 is a schematic plane view of the image sensor or the prospective imaging plane 50 of the image pickup apparatus 1, showing back-projected photoelectric conversion areas 661 to 664 shown in FIG. 3 onto the image sensor 50. Referring to FIG. 4, the back-projected images OPI1 and OPI2 are focus detecting areas in the image sensor 50. The back-projected image OPI1 corresponds to the photoelectric conversion areas 661 and 662, and the back-projected image OPI2 corresponds to the photoelectric conversion areas 663 and 664. Strictly speaking, the back-projected images of the photoelectric conversion areas 661-664 do not correspond to each other due to the distortion, but FIG. 4 simplifies non-correspondence.

The back-projected images OPI1 and OPI2 have a distorted sectorial shape as shown in FIG. 4. The back-projected image OPI1 is a primarily lateral line focus detecting area, and the back-projected image OPI2 is a primarily vertical line focus detection area. Since most of the back-projected images OPI1 and OPI2 overlap each other, a cross focus detecting area that can simultaneously detect both the vertical and lateral lines in a wide range of the image sensor or prospective imaging plane 50.

As discussed above, strictly speaking, the line sensors of the pair of photoelectric conversion areas do not correspond to each other in the image sensor or prospective imaging plane 50. Japanese Patent Application, Publication No. 61-15112 provides such a light blocking mask that the pair of photoelectric conversion areas have a common light receiving area during an in-focus time period of the image pickup lens 10. On the other hand, this embodiment forms such a light blocking mask that the pair of photoelectric conversion areas have a common light receiving area both during an in-focus time period and during a defocus time period of the image pickup lens 10, thereby realizing precise focus detection irrespective of the subject. More specifically, this embodiment previously calculates an optical-image moving direction according to defocus, provides a correspondence among the light receiving areas of the pair of photoelectric conversion areas, and forms a light blocking mask along the optical-image moving direction. This light blocking mask generates no parallax in the pair of light receiving areas in a direction orthogonal to the optical-image moving direction, or a non-correspondence between the light receiving areas of the pair of photoelectric conversion areas, from an in-focus state to a predetermined defocus of the image pickup lens 10.

Figures 5A, 5B:
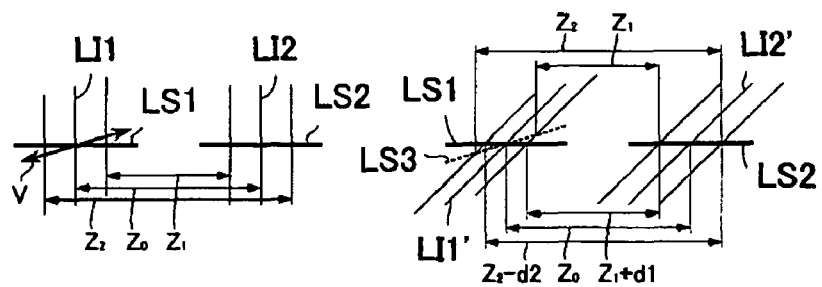
FIGS. 5A and 5B are views for explaining a pair of line sensors (light receiving areas of the photoelectric conversion areas) and an image interval in a focus detection using a phase difference system.

A description will now be given of a reason why a light blocking mask needs a shape along the optical-image moving direction. FIGS. 5A and 5B are views for explaining the pair of line sensors (the light receiving areas of the photoelectric conversion areas) and the image interval in the PDD focus detection. In FIGS. 5A and 5B, LS1 and LS2 denote the pair of line sensors.

FIG. 5A shows an in-focus time period of the image pickup lens 10. For example, assume line images LI1 and LI2 orthogonal to the pair of line sensors LS1 and LS2, and an image interval $Z_0$ between the line images LI1 and LI2. During a defocus time period of the image pickup lens 10, the image interval is $Z_1$ in the front focus and the image interval is $Z_2$ in the back focus. In addition, assume that the line image LI1 on the side of the line sensor LS1 moves in an arrow V direction due to the aberration, such as a distortion of the optical system.

FIG. 5B shows use of line images LI1' and LI2' that incline by 45° in an oblique direction under the same condition as FIG. 5A. In FIG. 5B, the image interval during an in-focus time period of the image pickup lens 10 is $Z_0$ similar to FIG. 5A, the image interval in the front focus is $Z_1$+d1 and the image interval in the back focus is $Z_2$−d2, different from FIG. 5A. This means that the focus detecting result differs depending upon the subject, and the present invention solves this problem. This embodiment moves the line image LI1 on the line sensor LS1 side in the arrow V direction. Assume a line sensor LS3 in the same direction as the arrow V direction. The image intervals in the front and back focuses are $Z_1$ and $Z_2$, corresponding to FIG. 5A. Therefore, the pair of line sensors have no parallax when the optical-image moving direction is considered, and provides precise focus detection irrespective of the subject.

A description will now be given of a calculating method of a shape of the light blocking mask when the optical-image moving direction is considered. This embodiment calculates the shape of the light blocking mask by steps I-III. The step I is the step of calculating a curve along the optical-image moving direction in the image sensor or prospective imaging plane 50. The step II is the step of determining the shape of the light blocking mask on the image sensor or prospective imaging plane 50. The step III is the step of calculating the shape of the light blocking mask on the photoelectric conversion areas 661 to 664 on the focus detecting sensor 66. This embodiment determines the shape of the light blocking mask on the image sensor or prospective imaging plane 50, and projects the shape of the light blocking mask onto the photoelectric conversion areas 661 to 664 in the focus detecting sensor 66, in an attempt to provide correspondence among the light receiving areas of the pair of photoelectric conversion areas and to form the light blocking mask along the optical-image moving direction.

Figure 6:
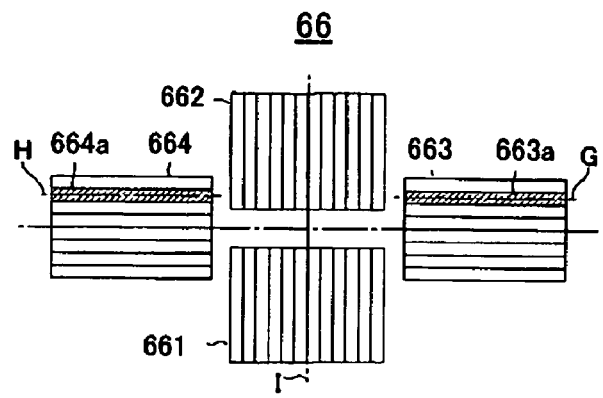
FIG. 6 is a schematic plane view showing the focus detecting sensor in the focus detecting optical system shown in FIG. 1.

Referring to FIGS. 6 to 11, the step I will be discussed. FIG. 6 is a schematic plane view of the focus detecting sensor 66 of the focus detecting optical system 60. This embodiment addresses the pair of line sensors 663a and 664a in the pair of photoelectric conversion areas 663 and 664 by way of example, as shown in FIG. 6. A centerline G is a straight line that passes the opening center of the line sensor 663a. A centerline H is a straight line that passes the opening center of the line sensor 664a. All the photoelectric conversion areas 661 to 664 have a shape with respect to a centerline I as a symmetrical axis according to distortions of the optical images OI1 to OI4 shown in FIG. 3. The centerline G when turning round around the centerline I becomes the centerline H.

Initially, two centerlines G and H are back-projected onto the image sensor or prospective imaging plane 50. The back projection may use a mathematically calculating method of previously approximating a relationship between the image sensor or prospective imaging plane 50 and the photoelectric conversion areas 661 to 664 (line sensors) with a polynomial function.

Figure 7:
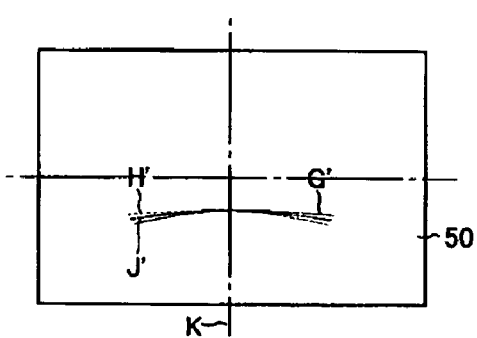
FIG. 7 is a view showing a back-projected centerline shown in FIG. 6 onto the image sensor or the prospective imaging plane.

FIG. 7 is a view showing the back-projected centerlines G and H shown in FIG. 6 onto the image sensor or prospective imaging plane 50. The centerline G' corresponds to a back-projected centerline G. The centerline H' corresponds to a back-projected centerline H. The centerlines G' and H' do not correspond to each other due to the distortion as discussed above. The distortion of the optical image has a symmetrical axis of only the centerline D. See FIG. 3. On the image sensor or prospective imaging plane 50, the centerline G' when rolling around with respect to the centerline K as a symmetrical axis becomes the centerline H'. Assume that a line J' passes a middle between the centerlines G1 and H', and serves as a representative centerline of the line sensors 663a and 664a.

Figure 8:
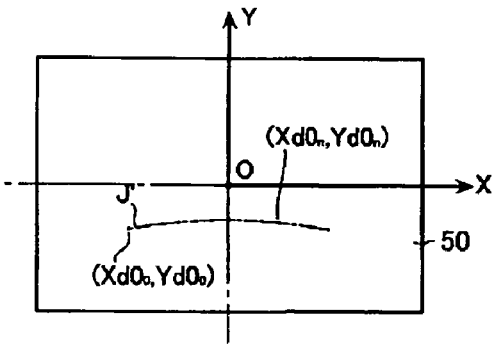
FIG. 8 is a view that extracts only a representative centerline J' shown in FIG. 7.

FIG. 8 is a view that picks up only the representative centerline J' shown in FIG. 7. An erecting coordinate system is set as shown in FIG. 8 with an origin O, an X-axis and a Y-axis. Next, discrete points are set at proper intervals on the representative centerlines J', and numbered in order from the left end in FIG. 8, as a 0th point, a first point, a second point, etc. When a coordinate of the 0th point is given $(Xd0_0, Yd0_0)$ with suffixes, a coordinate of the n-th point is given $(Xd0_n, Yd0_n)$.

Since the representative centerline J' is a light receiving center for the line sensors 663a and 664a, the optical-image moving direction on the image sensor or prospective imaging plane 50 is calculated based on a movement of each point on the representative centerline J' due to defocus of the image pickup lens 10.

Figure 9:
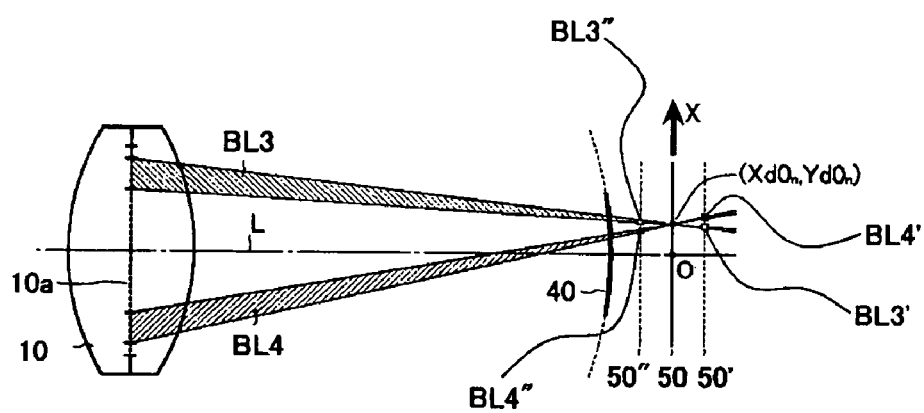
FIG. 9 is a view for explaining a movement of a point image on the image sensor or prospective imaging plane shown in FIG. 2.

FIG. 9 is a view for explaining a movement of a point image on the image sensor or prospective imaging plane 50. In FIG. 9, lights BL3 and BL4 represent lights that form an image at the n-th point among the lights that pass the pair of openings of the stop 63. The lights BL3 and BL4 correspond to the openings of the stop 63 corresponding to the photoelectric conversion areas 663 and 664 of the focus detecting sensor 66 shown in FIG. 2. FIG. 9 omits a refraction that actually occurs in the image pickup lens 10. In addition, although the subsidiary mirror 40 reflects the lights BL3 and BL4 that pass the stop 63, FIG. 9 shows as if these lights transmit the subsidiary mirror 40, in order to calculate a moving point on the image sensor or prospective imaging plane 50.

Referring to FIG. 9, in the in-focus state of the image pickup lens 10, the lights BL3 and BL4 accord with the n-th point $(Xd0_n, Yd0_n)$.

Next, assume that the image pickup lens 10 defocuses from the front focus. In the front focus, the prospective imaging plane is considered to exist at a position 50'. The lights BL3 and BL4 intersect as BL3' and BL4' with the prospective imaging plane 50', and BL3' and BL4' become moving points corresponding to the n-th point. Similarly, when the image pickup lens 10 defocuses to the back focus, the prospective imaging plane is considered to exist at a point 50". The lights BL3 and BL4 intersect as BL3" and BL4" with the prospective imaging plane 50", and BL3" and BL4" become moving points corresponding to the n-th point. The moving points BL3' and BL3" correspond to the light BL3, and the moving points BL4' and BL4" correspond to the light BL4. Since the lights BL3 and BL4 are divergent, they do not intersect at one point on the prospective imaging plane 50' or 50" in the defocus state, but this embodiment considers a spot center of gravity or centroid to be a moving point due to the defocus. In practice, a light reflecting position of the subsidiary mirror 40 varies due to the defocus of the image pickup lens 10. Thereby, a light interval and size of the pair slightly vary on the exit pupil 10a of the image pickup lens 10, but this embodiment ignores it for simple description purposes.

Figures 10, 11:
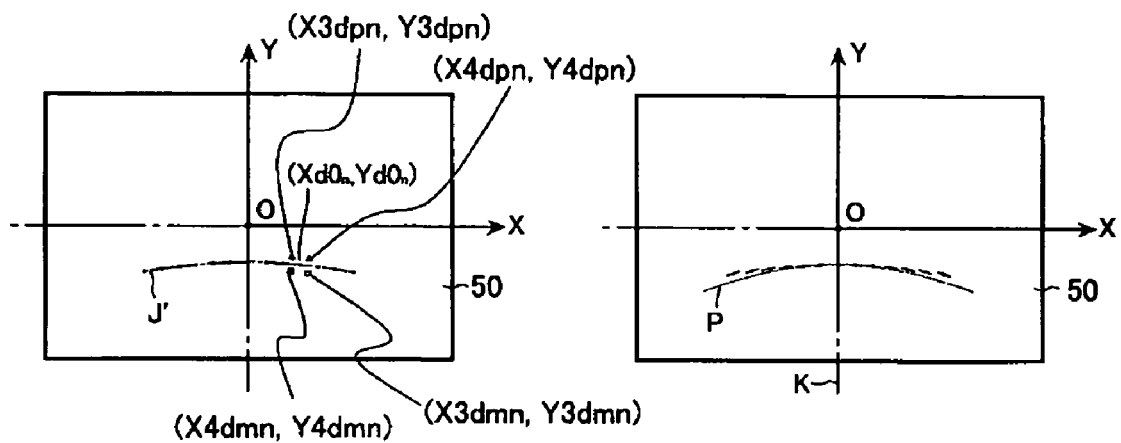
FIG. 10 is a view showing a two-dimensional movement of a point image on the image sensor or the prospective imaging plane shown in FIG. 2.
FIG. 11 is a view showing representative gradients at some points on a centerline shown in FIG. 10 with segments having appropriate lengths.

While FIG. 9 shows the point-image movements on the image sensor or prospective imaging plane 50 in the X-axis direction, FIG. 10 shows two-dimensional point-image movements in the XY-axes directions. In FIG. 10, a moving point corresponding to the light BL3 in the front focus is set to $(X3dm_n, Y3dm_n)$. A moving point corresponding to the light BL4 in the front focus is set to $(X4dm_n, Y4dm_n)$. A moving point corresponding to the light BL3 in the back focus is set to $(X3dp_n, Y3dp_n)$. A moving point corresponding to the light BL4 in the front focus is set to $(X4dp_n, Y4dp_n)$.

Referring to FIG. 10, a segment that connects two moving points in the front or back focus is an optical-image moving direction of the n-th point in the front or back focus on the image sensor or prospective imaging plane 50. In practice, the n-th point $(Xd0_n, Yd0_n)$ moves to square plots $(X3dm_n, Y3dm_n)$ and $(X4dm_n, Y4dm_n)$ or triangle plots $(X3dp_n, Y3dp_n)$ and $(X4dp_n, Y4dp_n)$ in FIG. 10. The DPP focus detection detects a relative moving amount of an image, and a distance between the square or triangle plots is the relative moving amount of the point image, and the segment that connects these plots is the optical image's relative moving direction. This embodiment refers to this moving direction simply as an optical-image moving direction.

The optical-image moving direction will be mathematically expressed as a gradient of a straight line that passes two points on the XY plane. A gradient $mdm_n$ in the front focus will be given in Equation 1 below and a gradient $mdp_n$ in the back focus will be given in Equation 2 below:

$$mdm_n = \frac{(X3dm_n - X4dm_n)}{(Y3dm_n - Y4dm_n)} \qquad [\text{EQUATION 1}]$$

$$mdp_n = \frac{(X3dp_n - X4dp_n)}{Y3dp_n - Y4dp_n} \qquad [\text{EQUATION 2}]$$

A representative gradient $m_n$ at the n-th point will be given in Equation 3 below from an average value between the gradient $mdm_n$ in the front focus and the gradient $mdp_n$ in the back focus:

$$m_n = \frac{mdm_n + mdp_n}{2} \qquad [\text{EQUATION 3}]$$

The representative gradient $m_n$ is a gradient at the n-th point on the centerline J' or an optical-image moving direction. While this embodiment calculates an optical-image moving direction using one point for the front and back focuses for an arbitrary defocus amount, the representative gradient $m_n$ may be calculated from the defocus amount. The defocus amount may be practically set to a defocus amount that can be adjusted to the in-focus state within one operation.

FIG. 11 is a view showing the representative gradients at some points on the centerline J' shown in FIG. 10 with segments having proper lengths. As apparent from FIG. 11, each segment has symmetry with respect to a centerline K as a symmetrical axis. Each segment is parallel to the X-axis on the Y-axis, and inclines as a distance from the Y-axis increases. The moving optical-image direction varies according to the image height due to the distortion in the focus detecting optical system 60. A curve that continuously contacts these segments forms a curve along the optical-image moving direction.

The discrete representative gradient $m_n$ is approximated by a function that sets X coordinates of respective points to variables. A function that differentiates an arbitrary function is a function representing a gradient of a pre-differentiated function, and a curve that smoothly contacts the optical-image moving direction can be calculated by integrating the function when the optical-image moving direction is made a function of a gradient in accordance with the X coordinate. Equation 4 below gives the representative gradient m at one point of the curve J' in the arbitrary X coordinate while approximating it with a function that sets the X coordinate to a variable:

$$m = f(x) \quad \text{[EQUATION 4]}$$

As shown in FIG. 10, each segment has symmetry, and a gradient has a sign reversing relationship with respect to the Y-axis as a center. An approximate equation of Equation 4 is preferably fitted by an odd function.

Equation 5 below gives a function that contacts the optical-image moving direction where g(x) is a function made by integrating Equation 4 on the condition of a constant term C:

$$Y = \int f(X) dX = g(X) + C \quad \text{[EQUATION 5]}$$

Since Equation 4 is an odd function, the integrated result becomes an even function symmetrical with respect to the Y-axis.

A curve P shown in FIG. 11 is made by plotting a function calculated from Equation 5 such that the curve J' corresponds to the Y-axis nodes on the condition of the constant C. The curve along the optical-image moving direction can be calculated on the image sensor or prospective imaging plane 50.

Figure 12:
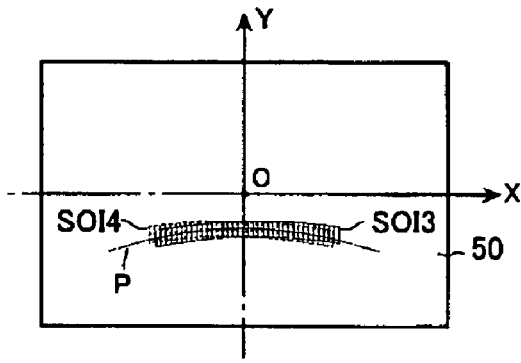
FIG. 12 is a schematic plane view showing the image sensor (prospective imaging plane) on which the pair of line sensor on FIG. 6 is back-projected.

A description will now be given of the step II. The step II determines the shape of the light blocking mask on the image sensor or prospective imaging plane 50 based on the curve P calculated by the step I. FIG. 12 is a schematic plane view of back-projected pair of the line sensors 663a and 664a shown in FIG. 6 onto the image sensor or prospective imaging plane 50. In FIG. 12, a back-projected image SOI3 corresponds to the line sensor 663a, and a back-projected image SOI4 corresponds to the line sensor 664a. The curve P is parallel-shifted in the Y-axis direction in a common area between the back-projected images SOI3 and SOI4, and a boundary line of the light blocking mask is determined.

Figure 13:
FIG. 13 is an enlarged plane view showing the pair of back-projected images shown in FIG. 12.

FIG. 13 is an enlarged plane view showing the pair of the back-projected images SOI3 and SOI4 shown in FIG. 12. Curves $P_U$ and $P_D$ are curves made by parallel-shifting the curve P in the Y-axis direction, and form boundary lines of the light blocking mask. The area enclosed by the curves $P_U$ and $P_D$ serves as a light receiving area. In determining a boundary line of the light blocking mask, the curve that connects the opening centers of gravity in the light blocking mask in each line sensor should correspond to the curve P. Since the back-projected image of each line sensor has a parallelogram that is approximately parallel to the Y-axis in this embodiment, the curve P is parallel-shifted to the Y-axis direction. When the line sensor is obliquely distorted, the boundary line of the light blocking mask should be determined such that the curve that connects the opening centers to each other, as well as the parallel-shifted curve, corresponds to the curve P.

Figure 14:
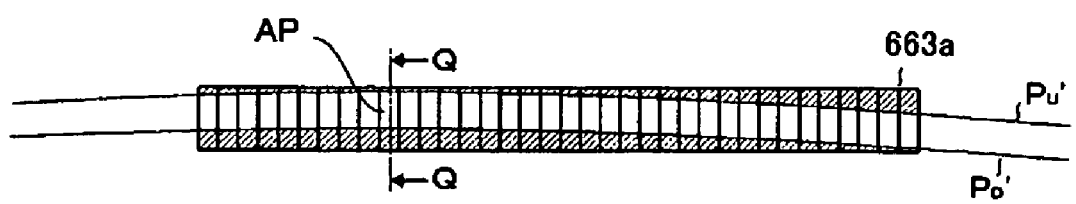
FIG. 14 is an enlarged plane view showing only one line sensor shown in FIG. 6.

The step III will now be discussed. The step III projects the boundary line of the light blocking mask on the image sensor or prospective imaging plane 50 determined by the step II onto the line sensor. FIG. 14 is an enlarged plane view showing only the line sensor 663a shown in FIG. 6. A curve $P_U$' corresponds to the projected image of the curve $P_U$. A curve $P_D$' corresponds to the projected image of the curve $P_D$. The curves $P_U$' and $P_D$' form boundary lines of the light blocking mask, and hatched part shown in FIG. 14 is light blocking part. The line sensor 664a has a bilateral symmetry to the line sensor 663a shown in FIG. 14.

It is ideal to set a boundary line of a light blocking mask such that an opening in the line sensor or photoelectric conversion area becomes as large as possible. For example, as in an opening AP of the line sensor 663a shown in FIG. 14, an illustrative description discusses an upper light blocking mask having a minimum light blocking amount.

Figure 15:
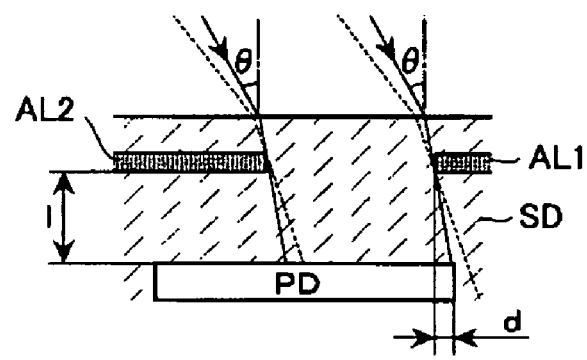
FIG. 15 is a schematic sectional view showing an opening in the line sensor on FIG. 1.

FIG. 15 is a schematic sectional view taken along a line Q-Q of the opening AP of the line sensor 663a. In the section Q-Q, the line sensor 663a includes, on a PD part that converts the light into the charge, a several-μm-thick semiconductor layer SD that is made of a light transmitting material, such as silicon oxide. This embodiment makes the light blocking mask of aluminum layers AL1 and AL2.

Referring to FIG. 15, the light incident upon the PD part at an angle θ reaches the PD part after refracted in the semiconductor layer SD. However, the aluminum layer AL1 cannot block the outermost ray of the light incident upon the PD part at an angle greater than the angle θ from entering the PD part, and the aluminum layer AL1 does not serve as a light blocking mask.

Therefore, an overlap amount d between the PD part and the aluminum layer AL1 should be set by considering the distance l between the PD part and the aluminum layer AL1, and the incident angle θ of the light. The overlap amount d should meet Equation 6 below, where n is a refractive index of the semiconductor layer SD:

$$d > 1 \times \tan\left(A \sin\left(\frac{\sin\theta}{n}\right)\right) \quad \text{[EQUATION 6]}$$

In practice, an alignment error between the PD part and the aluminum layers AL1 and AL2 generated in the semiconductor manufacturing process should also be considered.

Figure 16:
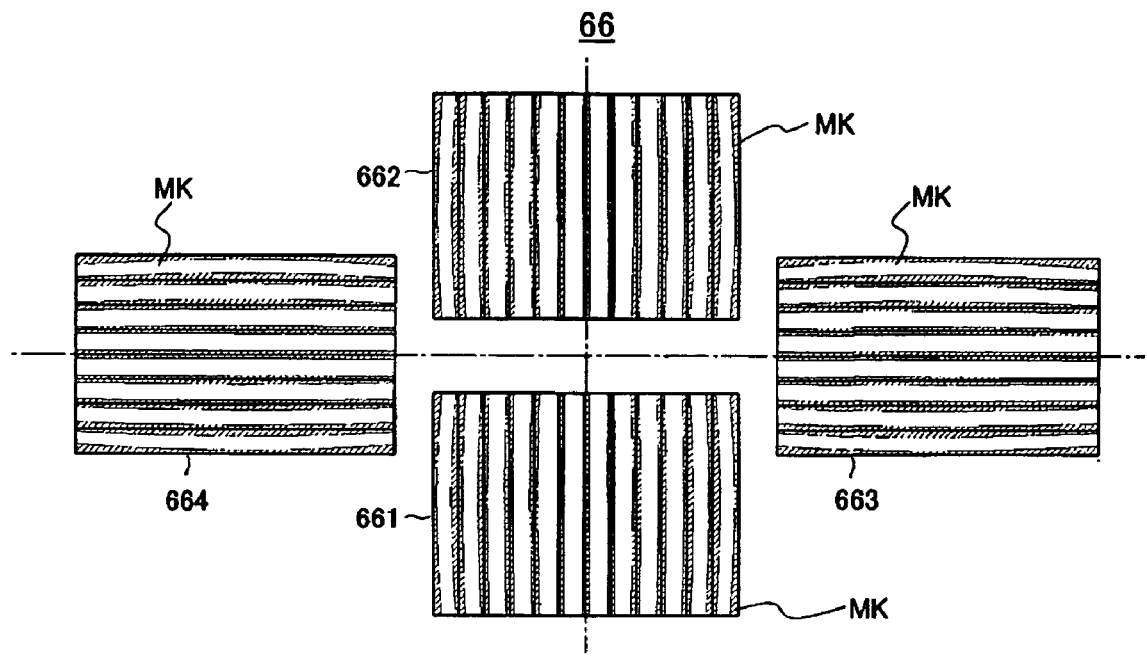
FIG. 16 is a schematic plane view showing focus detecting sensors provided to a light blocking mask.

FIG. 16 is a schematic plane view of the focus detecting sensor 66 that includes some light blocking masks MK, which are described above. Referring to FIG. 16, the hatched parts denote the light blocking masks MK, and the curvature increases as a distance from the central line sensor increases in the photoelectric conversion areas 661 to 664. Each light blocking mask MK has a uniform opening on the image sensor 50, as shown in FIG. 13.

While this embodiment discusses illustrative light blocking masks using the line sensors 663a and 664a in the pair of photoelectric conversion areas 663 and 664, this is true of the pair of photoelectric conversion areas 661 and 662. For the photoelectric conversion areas 661 and 662, an approximation of Equation 4 does not use an odd function, but may use a properly fitted function.

The present invention is not limited to this embodiment that illustratively uses part of the spheroid for the subsidiary mirror 40, and the present invention is applicable to the PDD focus detecting optical system using a field lens.

Thus, this embodiment provides a correspondence among the light receiving areas in the pair of photoelectric conversion areas during an in-focus time period of the image pickup lens 10, provides the focus detecting sensor 60 with a light blocking mask having a shape along the optical-image moving direction, and generates no parallax in the pair of light receiving areas in a direction orthogonal to the optical-image moving direction, from an in-focus time period to a defocus of the image pickup lens 10. Thereby, this embodiment provides precise and quick focus detections in a wide range in the shooting range.

Figure 17:
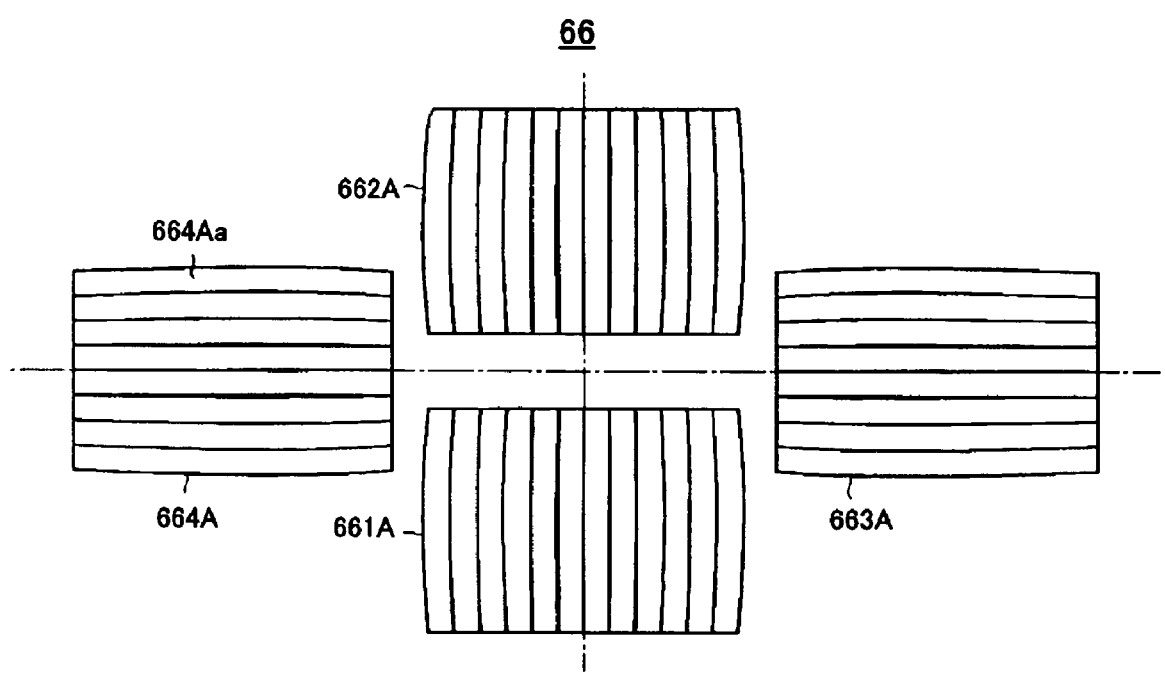
FIG. 17 is a schematic plane view showing one illustrative focus detecting sensor in the focus detecting optical system shown in FIG. 1.

Alternatively, this embodiment may improve a numerical aperture of a line sensor by applying the shape of the light blocking mask to the line sensor in each photoelectric conversion area. FIG. 17 is a schematic plane view of one illustrative focus detecting sensor 66 in the focus detecting optical system 60. FIG. 17 shows a sensor chip that has a photoelectric conversion element viewed from the cover glass. The photoelectric conversion areas 661A and 662A, and the photoelectric conversion areas 663A and 664A have a shape close to the light blocking masks SM shown in FIG. 16.

Figure 18:
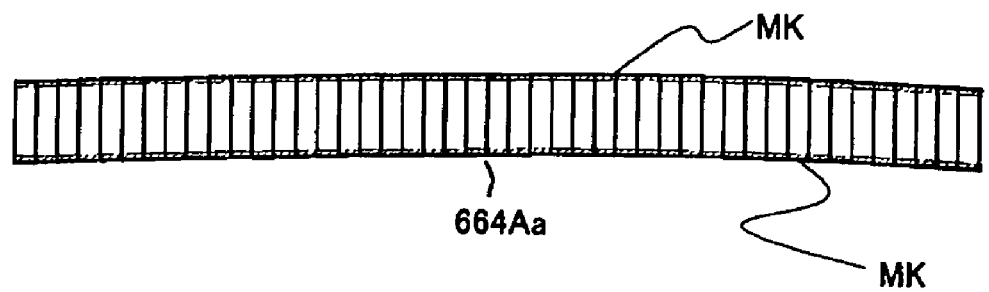
FIG. 18 is an enlarged view showing a line sensor on a photoelectric conversion area shown in FIG. 17.
Figure 19:
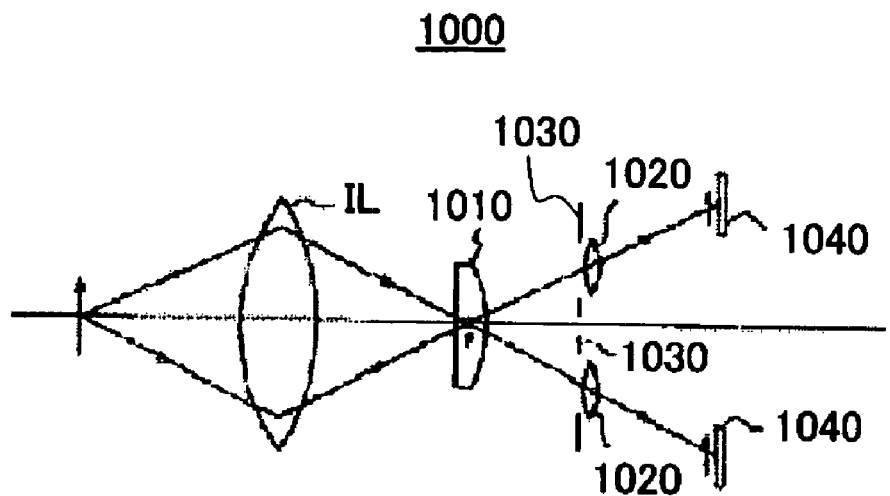
FIG. 19 is a schematic sectional view showing a structure of a focus detecting optical system using the phase difference detection method.
Figure 20:
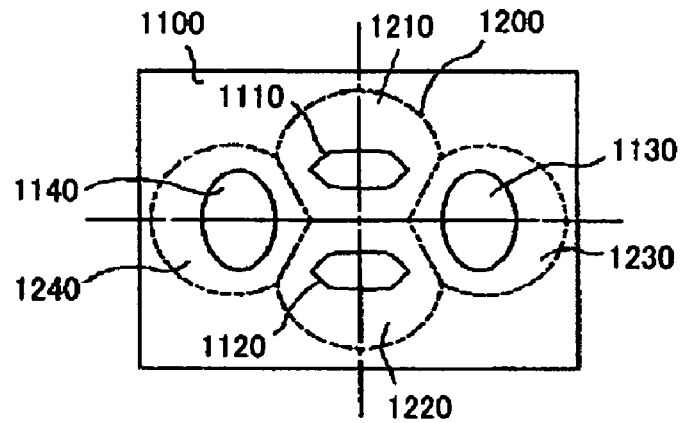
FIG. 20 is a schematic plane view showing a stop and a secondary imaging lens in a conventional focus detecting optical system.
Figure 21:
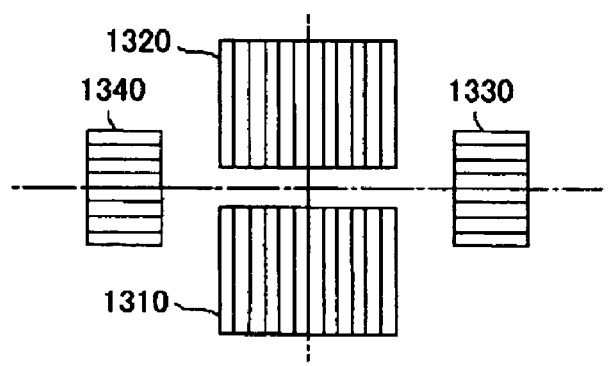
FIG. 21 is a schematic plane view showing a sensor in the conventional focus detecting optical system.
Figure 22:
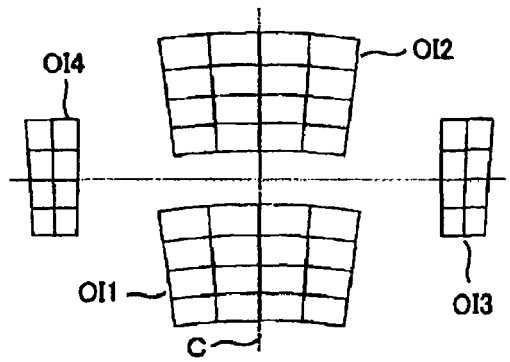
FIG. 22 is a view showing optical images formed on photoelectric conversion areas in a sensor in the conventional focus detecting optical system.
Figure 23:
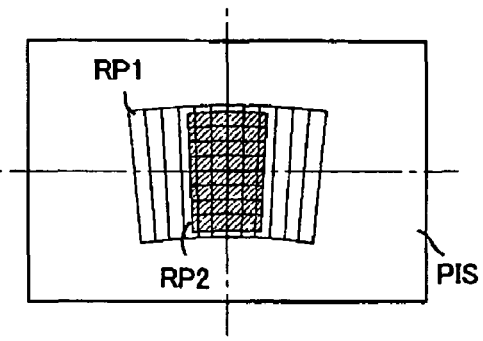
FIG. 23 is a schematic plane view showing a prospective imaging plane of the image pickup apparatus.
Figure 24:
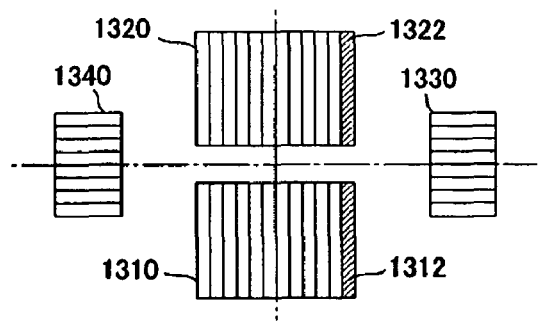
FIG. 24 is a schematic plane view showing a sensor of the conventional focus detecting optical system.
Figure 25:
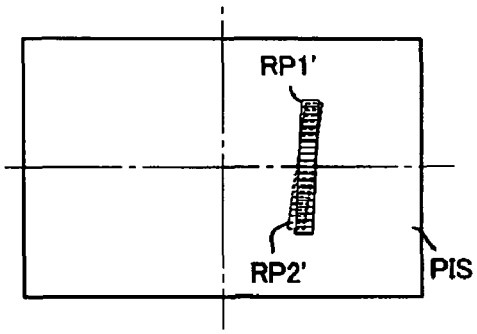
FIG. 25 is a schematic plane view showing a prospective imaging plane of the image pickup apparatus.
Figure 26:
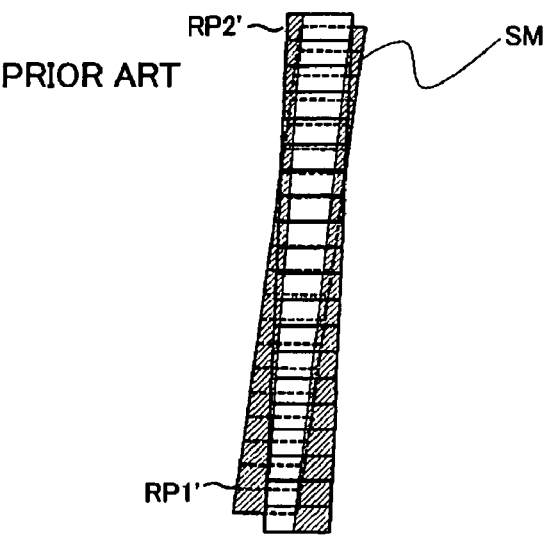
FIG. 26 is an enlarged view of a back-projected image shown in FIG. 25.

FIG. 18 is an enlarged view showing a line sensor 664Aa in the photoelectric conversion area 664A. The line sensor 664Aa has vertically oriented, rectangular and stepwise photoelectric conversion parts are arranged along the optical-image moving direction. A pair of light blocking masks MK are formed at both sides of the line sensor 664Aa. The light blocking mask MK serves to turn the stepwise line sensor into a line sensor having a smooth opening shape. Therefore, the light blocking mask MK can set a necessary minimum amount to smooth the opening, remarkably improving the numerical aperture. As discussed above, the light incident angle and the alignment error in the semiconductor manufacture process must be considered.

Turning back to FIG. 1, the controller 80 controls a focusing lens in the image pickup lens 10 and focuses the image pickup lens 10 based on the defocus direction and amount of the image pickup lens 10 detected by the focus detecting optical system 60. Specifically, the controller 80 calculates the driving amount of the focusing lens, and sends the calculation result to an image-pickup-lens controller (not shown), as described later, based on the defocus direction and amount of the image pickup lens 10. The image-pickup-lens controller drives the focusing lens via a motor etc., based on the driving amount of the focusing lens from the controller 80.

An operation of the image pickup apparatus 1 will be discussed. In viewing through a viewfinder, the light that transmits the image pickup lens 10 is reflected on the main mirror 20, and images on the focusing glass 32, and is viewed through the pentaprism 34 and the eyepiece 36. The light that transmits the main mirror 20 is reflected on the subsidiary mirror 40, and incident upon the focus detecting optical system 60. The focus detecting optical system 60 forms one or more pairs of images on the focus detecting sensors 66 and detects the focusing status of the image pickup lens 10. The controller 80 and image-pickup-lens controller drive the focus lens in the image pickup lens 10 based on the detection result for in-focus state.

On the other hand, in photographing or in obtaining an image to be recorded, the main mirror 20 and subsidiary mirror 40 retreat from the photographing optical path, and the image sensor 50 takes a subject image formed by the image pickup lens 10. The focus detecting optical system 60 used for the image pickup apparatus 1 provides a correspondence among the light receiving areas in the pair of photoelectric conversion areas, from the in-focus state to the out-of-focus state of the image pickup lens 10, precisely and quickly detecting focus in a wide range in the shooting range. Thereby, the image pickup apparatus 1 can take a high quality image.

As discussed, the above embodiment can provide a focus detecting apparatus that precisely and quickly detects a focusing status in a wide range in the shooting range, and an image pickup apparatus having the same.

Further, the present invention is not limited to these preferred embodiments, and various variations and modifications may be made without departing from the scope of the present invention.

This application claims a foreign priority benefit based on Japanese Patent Application No. 2005-191187, filed on Jun. 30, 2005, which is hereby incorporated by reference herein in its entirety as if fully set forth herein.

What is claimed is:

1. A focus detecting apparatus comprising:
a splitter configured to split light from an image pickup lens to form a plurality of images;
a photoelectric conversion element configured to photoelectrically convert the plurality of images into a plurality of signals, said focus detecting apparatus being configured to detect a focusing status of the image pickup lens based on at least one signal from said photoelectric conversion element; and
a light blocking mask configured to block the light from entering said photoelectric conversion element, said light blocking mask including a plurality of light transmittance regions having a curved shape adaptive to a moving direction of at least one of the plurality of images, wherein the moving direction of said at least one of the plurality of images varies according to an image height.

2. An image pickup apparatus for taking a subject image via an image pickup lens, said image pickup apparatus comprising:
a focus detecting apparatus according to claim 1; and
a controller configured to provide focus control of the image pickup lens based on a detection result of said focus detecting apparatus.

3. A focus detecting apparatus comprising:
a splitter configured to split light from an image pickup lens to form a plurality of images;
a photoelectric conversion element configured to photoelectrically convert the plurality of images into a plurality of signals, said focus detecting apparatus being configured to detect a focusing status of the image pickup lens based on at least one signal from said photoelectric conversion element; and
a light blocking mask configured to block the light from entering said photoelectric conversion element, said light blocking mask including a plurality of light transmittance regions having a curved shape adaptive to a moving direction of at least one of the plurality of images, wherein the curvature of the light blocking mask increases from a center to an outside of said photoelectric conversion element, and wherein the moving direction of said at least one of the plurality of images varies according to an image height.

4. An image pickup apparatus for taking a subject image via an image pickup lens, said image pickup apparatus comprising:
a focus detecting apparatus according to claim 3; and
a controller configured to provide focus control of the image pickup lens based on a detection result of said focus detecting apparatus.

5. A focus detecting apparatus comprising:
a splitter configured to split light from an image pickup lens to form a plurality of images;
a photoelectric conversion element configured to photoelectrically convert the plurality of images into a plurality of signals, said focus detecting apparatus being configured to detect a focusing status of the image pickup lens based on at least one signal from said photoelectric conversion element; and
a light blocking mask configured to block the light from entering said photoelectric conversion element, said light blocking mask including a plurality of light transmittance regions being adaptive to a moving direction of at least one of the plurality of images and having a uniform opening on an imaging plane of the image pickup lens, and wherein the moving direction of said at least one of the plurality of images varies according to an image height.

6. An image pickup apparatus for taking a subject image via an image pickup lens, said image pickup apparatus comprising:
- a focus detecting apparatus according to claim 5; and
- a controller configured to provide focus control of the image pickup lens based on a detection result of said focus detecting apparatus.

7. A focus detecting apparatus comprising:
- a splitter configured to split light from an image pickup lens to form a plurality of images;
- a photoelectric conversion element configured to photoelectrically convert the plurality of images into a plurality of signals, said focus detecting apparatus being configured to detect a focusing status of the image pickup lens based on at least one signal from said photoelectric conversion element; and
- a light blocking mask configured to block the light from entering said photoelectric conversion element, said light blocking mask including a plurality of light transmittance regions having a curved shape adaptive to a moving direction of at least one of the plurality of images, wherein the light blocking mask generates no parallax in a defocus state of the image pickup lens in a direction orthogonal to the moving direction of said at least one of the plurality of images that varies according to an image height.

8. An image pickup apparatus for taking a subject image via an image pickup lens, said image pickup apparatus comprising:
- a focus detecting apparatus according to claim 7; and
- a controller configured to provide focus control of the image pickup lens based on a detection result of said focus detecting apparatus.

9. A method for forming a light blocking mask for a focus detecting apparatus that is configured to split light from an image pickup lens to form a plurality of images, and is configured to detect a focusing status of the image pickup lens based on at least one signal from a photoelectric conversion element configured to photoelectrically convert the plurality of images into a plurality of signals, said method comprising the steps of:
- calculating a curve along a moving direction of at least one of the plurality of images, the moving direction of said at least one of the plurality of images varying according to an image height on an imaging plane of the image pickup lens;
- determining a shape of a plurality of light transmittance regions in the light blocking mask on the imaging plane based on the curve calculated by said calculating step such that a curved shape of the light blocking mask adapts to the moving direction of said at least one of the plurality of images; and
- projecting the shape of the light blocking mask onto the photoelectric conversion element determined by said determining step.

* * * * *